INVENTOR.
Paul R. Allison
BY
His Attorney

United States Patent Office 2,944,945
Patented July 12, 1960

2,944,945
ELECTROPLATING
Paul R. Allison, Dayton, Ohio, assignor to General Motors Corporation, Detroit, Mich., a corporation of Delaware Filed June 13, 1957, Ser. No. 665,503
1 Claim. (Cl. 204—15)

This invention relates to improvements in electroplating fixtures and to methods for electroplating semicylindrical bearings and the like.

It is the main object of the invention to provide a fixture and method for uniformly electroplating the concave bearing surface of a semicylindrical bearing wherein back plating of convex outer surface of the bearing is substantially eliminated and wherein a uniform electroplate is applied to the concave surface only of the bearing.

In carrying out this object, it is a further object to provide a fixture for holding the bearing which comprises a closed box wherein the concave side of the bearing faces one side of the box which is apertured to permit electrolyte to flow therethrough. At the backside of the bearing an electrode plate is provided which is the cathode whereas the anode is placed in the plating solution outside the fixture and in alignment with said aperture. In this manner, no direct electrical connection is made to the bearing whereby the backside of the bearing is actually anodic in character while the front side thereof is cathodic so that the backside of the bearing actually repels plating.

Further objects and advantages of the present invention will be apparent from the following description, reference being had to the accompanying drawings wherein a preferred embodiment of the present invention is clearly shown.

The electroplating of the bearing surface of semicylindrical bearings has always been a difficult problem when a uniform and quite thin electroplate is desired. Fixtures and methods for accomplishing this end are shown in Patents 2,761,831 and 2,500,206, for example. In these patents, plating fixtures are shown wherein a plurality of semicylindrical bearings may be plated and wherein the back surfaces thereof are shielded against plating whereas the front surfaces thereof are partially shielded to provide for uniform distribution of electroplate thereover. In each case, the bearings are directly connected in the electroplating circuit as cathodes and the concave sides thereof which are to receive the electroplate are positioned so as to face the anode. In all cases, there is a tendency, due to leakage, for the backsides of the bearings to accumulate a degree of electroplate since the backsides of the bearings are also cathodic and attract the anions in the solution.

The back plating of the bearing, or bearings, is very objectionable for two reasons. First, the electroplate being deposited is quite expensive and, in high production operations, the loss of electroplate on the back of the bearings creates considerable unnecessary expense and, secondly, since the bearings are precision type bearings and are not machined after the plating step, the back plating sometimes causes the bearings to be outside of the critical production limits whereby the bearings are too tight in their nests, etc.

All of these factors make it highly desirable to provide a fixture and method for plating semicylindrical bearings wherein back plating thereof is completely eliminated. The present invention accomplishes this in a facile manner without any additional expense with respect to operations and fixtures.

Figure 1:
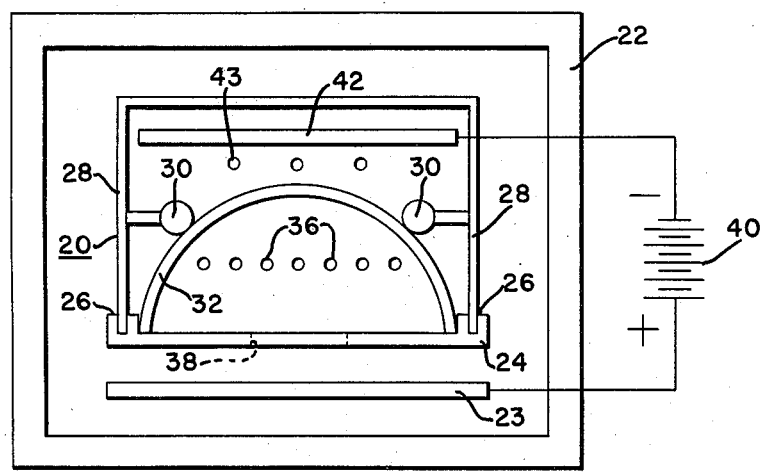
Figure 1 is a plan view of a plating fixture and plating tank showing the electrical circuit diagrammatically.

Referring specifically to the drawings, a plating box 20 is shown in Figure 1 which may be immersed in a bath of electrolyte in a plating tank 22. Also in the electrolyte in the tank 22 is an anode 23 made of the material to be electroplated. The plating box 20 is preferably closed at the top and bottom and is formed from an insulating material, such as Bakelite, or it may be formed from metal having a rubber plate coextensively provided thereover, as is well known in the art. The top of the box, not shown, may be removable and the front 24 of the box is also removable. The front 24 includes grooved side portions 26 which fit over and into substantial sealing engagement with the sides 28 thereof. In place of a closed box, the box may be open at the top and bottom and extend in both directions well past the articles to be plated and past the anode. This structure, while useful in some operations, is not as economical in production processes as the closed type box.

Figure 2:
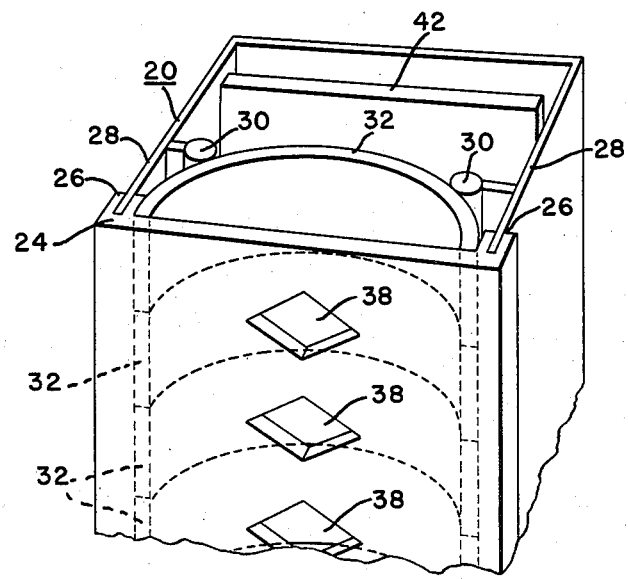
Figure 2 is a fragmentary perspective view of the plating fixture showing bearings in place therein.

Within the box and properly spaced from the front side thereof are two insulated rods 30 spaced so as to act as positioning members for bearings 32 when the bearings are inserted within the box. The rods 30 are positioned so that when the bearings 32 are placed in the box they will be held between the grooved shoulders 26 and the front 24 of the box when the front is in place. The bearings are stacked in the box as shown in Figure 2 to completely fill the box from top to bottom and act more or less as a seal against free fluid flow therearound at the top, bottom and sides thereof when the covers are in place. In other words, when the front 24 is positioned on the box 20, it tightly engages the flat edges of the bearings 32 while the semicircular edges of the bearings engage the top and bottom of the box and also engage adjacent edges to form a more or less semicylindrical column within the box and with the front thereof. The box may be apertured as at 36 at the bottom thereof and also at the top, not shown, so that the column of fluid at the concave surface of the bearings may flow freely in and out of the box from the top and bottom thereof and thus maintain the proper concentration of electrolyte solution. This flow may be caused by convection or by agitators or pumps, as desired.

The front 24 of the box acts as a shield and is apertured as at 38 in the form of diamonds, one of which is provided for each bearing which fits within the box. The diamond apertures 38 are positioned within the front of the box so as to fall directly in the center of each bearing. In place of diamonds, other types of apertures may be provided as shown in Patent 2,761,831 previously mentioned to provide a uniform plate on the bearing.

As noted in Figure 1, the anode 23 is positioned directly in front of the box and in alignment with the apertures 38 so that the ionic flow, when the anode is connected to a current source 40, is from the anode through the apertures 38 and on to the concave surfaces of the bearings.

The cathode in the present fixture comprises a flat metal plate 42 positioned at the back of the box 20 and connected to the negative side of the current source 40. The plate 42 may be made of any suitable metal although steel is usually satisfactory. The plate 42 may be solid or perforated. When in position in the box 20, the cathode 42 is immersed in the electrolyte within the box although, due to the sealing effect of the bearings, there is no free ionic flow past the bearings. There is fluid flow therearound as provided by apertures 43.

During the plating operation, ionic flow from the anode 23 causes an electrodeposition on the concave surfaces of the bearings 32 while the convex surfaces of the bearings 32 actually assume a positive charge and are anodic in character due to the plate 42 which is negatively charged. Thus, the concave surfaces of the bearings 32 actually repel electroplating so that no electroplating occurs at the back sides of the bearings. A negligible electroplate does occur on the plate 42. This has been found to be rather minor in character due to the distance and obstacles between the anode 23 and the cathode 42 and, after extended use of the fixture, the plate 42 may be stripped of the electroplate periodically whereby there is no loss of metal. After stripping, which is accomplished by conventional means of current reversal, the plate 42 may be reused.

It is apparent that the present invention is not limited to the specific structure of the box 20 as shown since it is well known that this structure may be varied widely so long as the principles set forth herein are adhered to. Furthermore, it is obvious that the box may be double-sided so that anodes may be placed at opposite sides thereof wherein a single cathode plate 42 is used between two rows of bearings, all of these modifications coming clearly within the purview of this invention which is specifically directed to a fixture and method for substantially eliminating back plating on semicylindrical bearings wherein a precision plating operation may be carried out at the concave sides thereof.

In each instance, it is desirable that the cathode plate 42 be positioned directly behind the bearing, or bearings, to be plated and preferably spaced therefrom a distance not more than the radius of the bearing although this spacing is best decided by test runs. The dimensions of the cathode plate should be at least equal to the projected dimension of the bearing, or bearings, to be plated. That is to say, the width of the plate should be at least equal to the outside diameter of the bearing while the length should be at least equal to the width of the bearing if a single bearing is being plated or the aggregate width of the bearings if more than one bearing is being plated.

While the forms of embodiment of the present invention as herein disclosed constitute preferred forms, it is to be understood that other forms might be adopted.

What is claimed is as follows:

The method of electroplating bearing shells so as to plate only one surface thereof, comprising the steps of providing a plating container having electrically nonconductive surfaces, placing a plurality of bearing shells in an end-to-end semi-sealing relationship with each other, positioning said plurality of shells in said plating container with the edges of said shells abutting opposite ends of a side of said non-conducting container surface to form a partition in said container, positioning an anode on one side of said bearing shell partition and out of contact with said shells and with said container, placing a single plate-type cathode having a width substantially equal to the projected width of said bearing shells, on the second side of said partition and out of contact with said shells and said container, filling all of said container with an electroplating bath, and finally flowing a plating current through and simultaneously agitating said bath to thereby cause limited ionic flow between the semi-sealed ends of said shells and electro-deposition on only the side of said shells facing the anode.

References Cited in the file of this patent

UNITED STATES PATENTS

| | | |
|---|---|---|
| 1,509,101 | Dana | Sept. 23, 1924 |
| 1,745,912 | Richardson | Feb. 4, 1930 |
| 2,500,206 | Schaefer et al. | Mar. 14, 1950 |
| 2,560,534 | Adler | July 17, 1951 |
| 2,727,858 | Klein | Dec. 20, 1955 |
| 2,761,831 | Luechauer | Sept. 4, 1956 |

FOREIGN PATENTS

| | | |
|---|---|---|
| 608,557 | Great Britain | Sept. 16, 1948 |
| 579,941 | Great Britain | Aug. 21, 1946 |